３,020,316
BIS(2-METHOXYETHYL) ETHER PRODUCTION
Robert M. Thomas, Tonawanda, and Guenter K. Weisse, Niagara Falls, N.Y., assignors to Olin Mathieson Chemical Corporation, a corporation of Virginia
No Drawing. Filed Feb. 28, 1957, Ser. No. 642,933
3 Claims. (Cl. 260—615)

This invention relates to the methoxylation of bis(2-chloroethyl) ether by means of sodium hydroxide and methanol to form bis(2-methoxyethyl) ether. This invention involves a method for decreasing the reaction time for this reaction, for increasing its yield or for accomplishing both these ends.

It has been shown by L. Cretcher et al., JACS 47, 163–6 (1925), that bis(2-chloroethyl) ether can be treated with ethanol and potassium hydroxide to form bis(2-ethoxyethyl) ether. According to this reference, the reaction mixture was left overnight on a water bath and a yield of only 41 percent was obtained. It is also shown, as in A. Gallaugher et al., JACS 58, 813 (1936), that bis(2-chloroethyl) ether will react with sodium methylate in methanol to give bis(2-methoxyethyl) ether. A yield of 70 percent was realized by allowing the reaction mixture to remain at 25° C. for 2–3 days, while a yield of only 50–60 percent was obtained at 80° C.

In accordance with this invention, bis(2-methoxyethyl) ether has been synthesized by reaction of bis(2-chloromethyl) ether with sodium hydroxide and methanol and it has been verified that the yield of bis(2-methoxyethyl) ether is adversely affected by elevated temperatures. Thus, by allowing the reaction to proceed at room temperature for a period of 2 to 3 months a yield of 84 percent of bis(2-methoxyethyl) ether is obtained. By increasing the reaction temperature to 73–75° C., which is under reflux conditions, yields in the order of 73–75 percent are obtained. A further decrease in yield is obtained if the reaction is conducted at 100 or 120° C. The yield is inversely proportional to the reaction temperature. In view of this inverse relationship, it has previously been necessary to compromise between a high yield and a long reaction time or a lesser yield and a shorter reaction time.

Among the objects of this invention is the provision of method whereby high yields of bis(2-methoxyethyl) ether can be obtained from caustic and methanol in a short reaction time and whereby yields of bis(2-methoxyethyl) ether greater than those shown in the art can be obtained. A still further object of this invention is to produce bis(2-methoxyethyl) ether economically from cheaply available materials, i.e., methanol and caustic.

In accordance with these objects, it has been discovered that the total reaction time of the reaction of methanol, sodium hydroxide, and bis(2-chloroethyl) ether to produce bis(2-methoxyethyl) ether can be shortened without adversely affecting the yield by the use of a temperature in the range from 45° C. to 150° C., so long as such a temperature is not employed until substantially all of the bis(2-chloroethyl) ether has been converted to the intermediate 2-chloroethyl-2-methoxyethyl ether at a temperature at least 25° C. lower and in the range of 20° C. to 80° C.

The increased yield produced by the process is believed to be due to the difference in reactivity of the second chlorine atom and the first chlorine atom of the dichloroethyl ether. Thus, in the reactions according to the equations, (1) 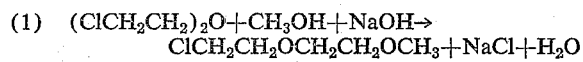

and (2) 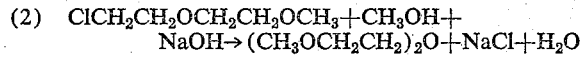

it appears that, whereas the first chlorine atom of the bis(2-chloroethyl) ether reacts at relatively low temperatures to produce the intermediate 2-chloroethyl-2-methoxyethyl ether with the production of few undesirable by-products, the use of high temperatures in this step results in excessive formation of such by-products as methoxyethyl vinyl ether and 2-chloroethyl vinyl ether from the bis(2-chloroethyl) ether and, therefore, in the formation of compounds which do not further react to form the desired product. By contrast, the intermediate 2-chloroethyl-2-methoxyethyl ether can be further and readily methoxylated at the second chlorine atom at the higher temperatures without the formation of the aforementioned undesirable by-products. For example, when methanol, caustic and bis(2-chloroethyl) ether were reacted for 14 days at room temperature and the temperature was then raised to 75° C. for 8 hours, an 84 percent by weight yield of bis(2-methoxyethyl) ether was obtained. The saving in reaction time over that required at room temperature was 2 months. Running the entire reaction at 73–75° C. gives only a 75 percent yield, as stated above.

It has been found that at 20° C. to 80° C. the reaction of the first chlorine atom of the bis(2-chloroethyl) ether proceeds at a significantly faster rate than does the reaction of the second chlorine atom. It appears, that, when 45 to 50 percent by weight of the theoretical amount of salt to be produced in the two reactions of the above-noted equations is formed at such temperatures, very little bis(2-chloroethyl) ether remains in the reaction mixture and the desired intermediate predominates therein. At the same time, some of the salt formed is due to the reaction of the second chlorine atom, whereby the desired bis(2-methoxyethyl) ether is formed. Preferably, then, to achieve a conversion of substantially all of the bis(2-chloroethyl) ether to the intermediate 2-chloroethyl-2-methoxyethyl ether, an amount of salt in excess of 45 to 50 percent by weight of the theoretical amount should be produced at 20° C. to 80° C. Thus, it has been found that if temperatures of 20° C. to 80° C. are employed until 45 to 80 percent by weight of the theoretical amount of salt is produced and if the temperature is then raised at least 25° C. to hasten its completion the total reaction time of the process can be appreciably lowered without adversely affecting the yield.

In addition to the improvement over the 70 percent yield taught by A. Gallaugher et al., a further saving is obtained in using the present process, since the cost of sodium methylate previously used is more than twice the cost of an equivalent amount of caustic and methanol.

In the preferred embodiment of this invention, a mixture of sodium hydroxide and methanol is added to the bis(2-chloroethyl) ether. Alternatively, aqueous caustic can be added to a solution of the chloro-ether in methanol. The final yield is somewhat less when the dichloroether is added to a mixture of methanol and caustic. When the reactants are mixed, the temperature within the reaction flask rises. However, the best yield and purest product results when the temperature rise is not allowed to exceed about 40° C. The cooling means, for example, a water or ice bath, should not be removed until the reaction rate diminishes to a point where atmospheric cooling is sufficient to maintain the reactants at the preferred 40° C. This low temperature step can be performed at room temperature for as long as desired; however, we have found it most economical to carry it out for approximately 50 to 150 hours.

The second or high-temperature step has been carried out at temperatures as high as 150° C. under pressure. Such conditions lessen the time required for this step below the approximately 5 to 15 hours which are required when a temperature of 125° C. and superatmospheric pressure are employed.

The yields realized by the use of this two-step process can be in the vicinity of 80 percent. While the best yields are obtained if an initial 45 percent or more salt production is carried out at 20° C. to 40° C., a reaction time of one or two days may be too long for a particular set of circumstances. In this case, an initial temperature of 60° C. to 80° C. will bring about the conversion of at least 45 percent in about 2 hours. The temperature can then be raised to, for example, 100–125° C. effecting complete conversion in an additional 30–40 minutes.

While improved yields are obtained with almost any ratio of reactants by using the two-temperature step process, it is preferable to use either aqueous caustic solutions in excess of about 50 weight percent concentration or solid sodium hydroxide, their basic material content being in about a 10 percent by weight excess over the stoichiometric amount, and a molar ratio of methanol to bis(2-chloroethyl) ether of from about 6:1 to about 13:1. The yield of product can be slightly increased by using more methanol; however, this advantage is offset by the additional effort necessary to remove it prior to the isolation of the product.

It should be pointed out that complete reaction is helpful to the recovery of a pure product, since the intermediate 2-chloroethyl-2-methoxyethyl ether boils within a few degrees of bis(2-methoxyethyl) ether. These compounds are, therefore, not readily separable by fractional distillation.

*Examples I, II and III*

The same general procedure was followed in the three examples below. The caustic, bis(2-chloroethyl) ether and methanol were added simultaneously to the reaction vessel and were maintained at 40° C. for the lengths of time and conversions (percentages of theoretical amounts of salt produced) indicated. The temperature was maintained by means of a water cooling bath applied to the reaction vessel. The percent conversion was periodically calculated by withdrawing a homogeneous sample of the well-agitated reaction slurry obtained initially in each case from 3 gram moles of bis(2-chloroethyl) ether, 36 gram moles of methanol, and 6.6 gram moles of sodium hydroxide and determining the remaining caustic and the by-product chloride ion therein. The caustic was determined by titration with a standard sulfuric acid solution and the chloride ion by the Mohr method. While the volatility of the warm methanol in the reaction mixture made accurate sampling difficult and the determination of either the remaining caustic or of the chloride ion alone uncertain, the ratio of the one to the other could be accurately determined in a given sample. Hence, the percent conversion could be accurately calculated applying the following equation, in which the conversion is independent of the size or weight of the sample withdrawn:

$$\frac{\text{moles (Cl)}^- \text{ times } (1+X)}{\text{moles (OH)}^- + \text{moles (Cl)}} \text{ times } 100 = \text{percent conversion}$$

where X indicates the excess of caustic used. If, for instance, 10 percent excess caustic is used, $X=0.1$; if 20 percent is used, $X=0.2$, etc.

In the three examples, after the initial period at 40° C., the temperature was raised to 72–75° C. and the mixtures were refluxed for the periods indicated. The refluxing methanol was then removed overhead. This required 5 to 5½ hours as indicated. The total reaction time is stated below. Finally, the yield of crude bis(2-methoxyethyl) ether recovered by distillation is shown.

|  | Example I | Example II | Example III |
|---|---|---|---|
| Caustic concentration, percent | 50 | 73 | solid |
| At 40° C.: |  |  |  |
| Reaction time in hours | 56 | 106 | 75 |
| Conversion (percentage of theoretical amount of salt produced) percent | 49 | 76 | 65 |
| At 72–75° C.: |  |  |  |
| Reaction time in hours | 7.8 | 15 | 17.5 |
| Alcohol removed in hours | 5.5 | 5 | 5.5 |
| Total reaction time in hours | 69.3 | 126 | 98 |
| Yield of bis(2-methoxy-ethyl) ether, percent | 78.6 | 79.6 | 80.0 |

*Example IV*

In two experiments, in order to compare their yields and their reaction times, a single temperature-step reaction (A) and the two temperature-step reaction (B) were undertaken. In both experiments, the 12 to 1 molar ratio of methanol to bis(2-chloroethyl) ether and the 6.6 gram moles of sodium hydroxide used in Examples I to III were employed. The results are as follows:

|  | A | B |
|---|---|---|
| Caustic concentration, percent | 50 | 50 |
| At 75° C.: |  |  |
| Reaction time in hours | 22 | 6 |
| Conversion (percentage of theoretical amount of salt produced) percent |  | 50–60 |
| At 120° C.: |  |  |
| Reaction time in hours |  | 2 |
| Total reaction time in hours | 22 | 8 |
| Yield of bis(2-methoxy-ethyl) ether, percent | 75.4 | 74.4 |

Thus, by raising the temperature after 50 to 60 percent conversion, the yield was only slightly affected, but the reaction time was decreased by 14 hours.

What is claimed is:
1. A process for the production of bis(2-methoxyethyl) ether which comprises as a first step reacting methanol, sodium hydroxide and bis(2-chloroethyl) ether at from 20° C. to 80° C. until substantially all of the bis(2-chloroethyl) ether has been converted to the intermediate 2-chloroethyl-2-methoxyethyl ether as measured by the production of from 45 to 80 percent by weight of the theoretical amount of sodium chloride and as a second step raising the reaction mixture to a temperature of from 45° C. to 150° C. and continuing the reaction to substantial completion, with the proviso that the temperature in the second step is at least 25° C. higher than the temperature in the first step.

2. The process of claim 1 in which the ratio of methanol to bis(2-chloroethyl) ether is from 6:1 to 13:1 and in which the sodium hydroxide is present in an amount 10 percent in excess of the stoichiometric requirement.

3. The process of claim 2 in which the reaction temperature is 40° C. and the sodium chloride production is at least 50 percent by weight of the theoretical amount in the first step.

References Cited in the file of this patent

Ser. No. 83,531, Alexander et al. (A.P.C.), published March 18, 1952, in 656 O.G. 892.